(12) United States Patent
Neuwirth

(10) Patent No.: US 10,579,996 B2
(45) Date of Patent: *Mar. 3, 2020

(54) PRESENTING A DOCUMENT TO A REMOTE USER TO OBTAIN AUTHORIZATION FROM THE USER

(71) Applicant: Volker Neuwirth, Eden, UT (US)

(72) Inventor: Volker Neuwirth, Eden, UT (US)

(73) Assignee: Zukunftware, LLC, Eden, UT (US)

( * ) Notice: Subject to any disclaimer, the term of this patent is extended or adjusted under 35 U.S.C. 154(b) by 818 days.

This patent is subject to a terminal disclaimer.

(21) Appl. No.: 14/212,783

(22) Filed: Mar. 14, 2014

(65) Prior Publication Data

US 2014/0201081 A1    Jul. 17, 2014

Related U.S. Application Data

(63) Continuation-in-part of application No. 14/012,005, filed on Aug. 28, 2013, and a continuation-in-part of
(Continued)

(51) Int. Cl.
| | |
|---|---|
| G06Q 20/38 | (2012.01) |
| G06Q 20/20 | (2012.01) |
| G06Q 20/40 | (2012.01) |

(52) U.S. Cl.
CPC ....... *G06Q 20/3825* (2013.01); *G06Q 20/206* (2013.01); *G06Q 20/382* (2013.01); *G06Q 20/40145* (2013.01)

(58) Field of Classification Search
CPC .............. G06Q 20/38; G06Q 20/3825; G06Q 20/40145; G06Q 20/382
(Continued)

(56) References Cited

U.S. PATENT DOCUMENTS 6,018,724 A * 1/2000 Arent ................... G06F 21/645
705/39
6,091,835 A    7/2000 Smithies
(Continued)

FOREIGN PATENT DOCUMENTS

| | | |
|---|---|---|
| DE | 202012100620 U1 | 6/2012 |
| WO | 2007128131 A1 | 11/2007 |
| WO | 2010096245 | 8/2010 |

OTHER PUBLICATIONS

"Riivari, Jukka, "Mobile banking: A powerful new marketing and CRM tool for financial services companies all over Europe", Sep. 2005, Journal of Financial Services Marketing 10, p. 11" (Year: 2005).*

(Continued)

*Primary Examiner* — Eric T Wong
*Assistant Examiner* — Kevin T Poe
(74) *Attorney, Agent, or Firm* — Kirton McConkie; Brian Tucker

(57) ABSTRACT

The present invention is directed to receiving a signature (or other type of verification or confirmation) from a remote user. The present invention enables a merchant to send a signature request over a network to any device having a browser and touch screen or other means for receiving user input. An input area is displayed within the browser on the user's device. When the user inputs a signature (or other form of user input acting as authorization), the signature can be routed over a network back to the merchant to provide authorization for a transaction. Various forms of authentication can be used to verify the identity of the user providing authorization for the transaction. A document can be presented to a remote user in conjunction with a request for authorization input from the user.

20 Claims, 17 Drawing Sheets

Related U.S. Application Data application No. 13/731,942, filed on Dec. 31, 2012, application No. 14/212,783, filed on Mar. 14, 2014, which is a continuation-in-part of application No. 14/080,292, filed on Nov. 14, 2013, now Pat. No. 10,235,672, which is a continuation-in-part of application No. 13/731,879, filed on Dec. 31, 2012, now Pat. No. 9,799,029.

(60) Provisional application No. 61/700,250, filed on Sep. 12, 2012.

(58) Field of Classification Search
USPC .......................................................... 705/44
See application file for complete search history.

(56) References Cited

U.S. PATENT DOCUMENTS

| | | | |
|---|---|---|---|
| 6,304,915 | B1 | 10/2001 | Nguyen et al. |
| 7,934,098 | B1 | 4/2011 | Hahn |
| 2002/0156685 | A1* | 10/2002 | Ehrlich et al. ................... 705/26 |
| 2003/0138135 | A1* | 7/2003 | Chung et al. ................. 382/119 |
| 2004/0010634 | A1* | 1/2004 | Takashima ............ G06F 17/243 710/1 |
| 2004/0201751 | A1 | 10/2004 | Bell et al. |
| 2005/0246263 | A1* | 11/2005 | Ogg ....................... G06Q 40/04 705/37 |
| 2006/0064373 | A1 | 3/2006 | Kelley |
| 2006/0167746 | A1* | 7/2006 | Zucker ................... G06Q 30/02 705/14.54 |
| 2006/0212407 | A1* | 9/2006 | Lyon ............................... 705/71 |
| 2007/0022053 | A1* | 1/2007 | Waserstein et al. ............ 705/42 |
| 2007/0078797 | A1 | 4/2007 | Won |
| 2008/0065546 | A1 | 3/2008 | Ramachandran |
| 2008/0086425 | A1* | 4/2008 | Ruggiero ............... G06Q 20/32 705/67 |
| 2008/0222049 | A1* | 9/2008 | Loomis .................. G06Q 20/10 705/75 |
| 2009/0171839 | A1* | 7/2009 | Rosano et al. ................... 705/40 |
| 2010/0241565 | A1* | 9/2010 | Starai et al. ..................... 705/44 |
| 2010/0257612 | A1 | 10/2010 | McGuire et al. |
| 2010/0280946 | A1 | 11/2010 | Batten |
| 2011/0093777 | A1 | 4/2011 | Dunn |
| 2012/0005038 | A1* | 1/2012 | Soman ................... G06Q 20/12 705/26.41 |
| 2012/0011066 | A1* | 1/2012 | Telle et al. ....................... 705/44 |
| 2012/0078791 | A1 | 3/2012 | Huang et al. |
| 2012/0173431 | A1* | 7/2012 | Ritchie ................ G06Q 20/367 705/65 |
| 2012/0221470 | A1* | 8/2012 | Lyon ............................. 705/44 |
| 2012/0239417 | A1* | 9/2012 | Pourfallah ............. G06Q 50/22 705/2 |
| 2012/0253978 | A1 | 10/2012 | Bishop et al. |
| 2012/0311706 | A1 | 12/2012 | Newman |
| 2013/0013227 | A1 | 1/2013 | Ajay et al. |
| 2013/0132274 | A1* | 5/2013 | Henderson et al. ............ 705/41 |
| 2013/0148024 | A1* | 6/2013 | Shin ....................... G06Q 20/40 348/552 |
| 2014/0012757 | A1 | 1/2014 | Henderson et al. |
| 2014/0040125 | A1* | 2/2014 | Kunz et al. ..................... 705/41 |

OTHER PUBLICATIONS

Kang Inwon, Lee Kun Chang, Kim Sang-Man, Lee Jiwon, "THe effect of trust transference in multi-banking channels;, offline, online and mobile", International Journal of Mobile Communications vol. 9, No. 2, 2011, p. 103 (Year: 2011).*

"Sumanjeet, Singh, "Emergence of Payment Systems in the Age of Electronic Commerce: The State of Art", Asia Pacific Journal of Finance and Banking Research vol. 3 No. 3 2009" (Year: 2009).*

International Search Report for WO/2014/042911 (PCT/US13/57859) dated Mar. 6, 2014.

International Search Report for WO/2014/105702 (PCT/US13/76939) dated Mar. 13, 2014.

International Preliminary Report on Patentability for WO/2014/042911 (PCT/US13/57859) dated Sep. 12, 2014.

* cited by examiner

200

| http://somewebsite.com |

First Name: [          ]   Last Name: [          ]  ⎫
                                                    ⎬ 201
Routing #: [          ]   Account #: [          ]   ⎪
Check #:   [          ]   Type:   Savings ◉  Checking ◉  ⎭

Amount: [          ]

202                        203
Mobile #: [          ]    Email: [          ]

204 — [ Request Signature ]

200 http://somewebsite.com

First Name: ☐  Last Name: ☐ ⎫
                                ⎬ 201
CC #: ☐  Expiration: ☐         ⎪
CCV2 #: ☐                       ⎪
                                ⎪
Amount: ☐                      ⎭

202  203

Mobile #: ☐  Email: ☐

601  204 — Request Signature

Company A
12/31/2012   12:41 PM

For: ...

TOTAL          $60.64

*AMEX*
XXXX XXXX XXXX 7890
12/12

Signature

Process Credit Card

| http://somewebsite.com |

First Name: [ ]   Last Name: [ ]                    ⎫
                                                    ⎬ 201
Routing #: [ ]   Account #: [ ]                     ⎪
Check #: [ ]     Type:  Savings ◉  Checking ◉       ⎭

Amount: [ ]

202                    203
Mobile #: [ ]          Email: [ ]

204 — [Request Signature]

John Doe                    DATE _____         1001
123 N Street
City, State 12345                                       501
Pay                                          $ [    ]
TO THE ORDER OF
                                                        502
For _____        *John Doe*                [Process
  123456789  000123456789  1001                       eCheck]

FIG. 7

200 http://somewebsite.com

First Name: ☐   Last Name: ☐   } 201

CC #: ☐   Expiration: ☐
CCV2 #: ☐

Amount: ☐

202   203

Mobile #: ☐   Email: ☐

601   204 — Request Signature

Company A
12/31/2012   12:41 PM

For: ...

TOTAL          $60.64

*AMEX*
XXXX XXXX XXXX 7890
12/12

Signature
*John Doe*

Process Credit Card
602

1201
Receive An Electronic Message That Includes A Link To A Web Page

1202
In Response To The Selection Of The Link, Display A Web Page That Includes An Area For Receiving User Input From A User Via A Touch Screen Of The Client Computing Device 1203
Send The User Input Over The Internet To A Merchant Computing System To Enable The Merchant Computing System To Perform The Transaction Using The User Input

FIG. 12

ID # 615149197615515
COMPANY NAME
Signature/transaction audit page
2013/09/17 16:59:11      Johnny Test
Location: 372 24th Street, Ogden, Utah, United States
Delivered by Phone #      +1801-949-9999
Receipt requested:      johnny@google.com
# of attempts for shared secret:      one
Shared secret question:      What is your last four of your SSN#?
Shared secret Answer:      XXX3
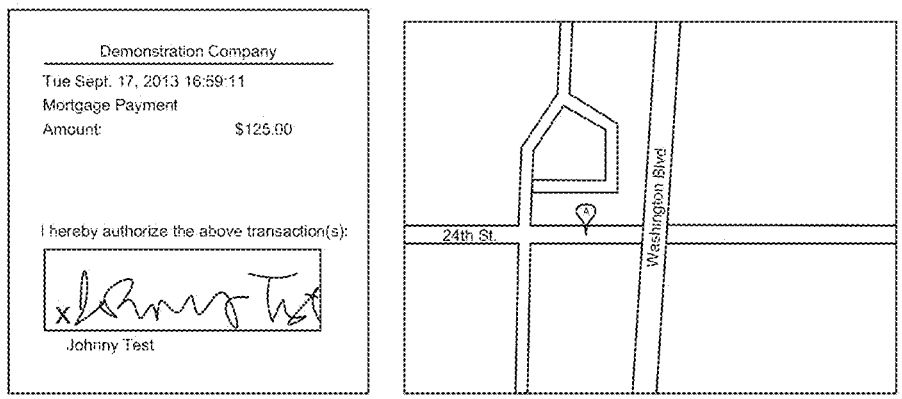
(A) 372 24th St
Ogden, UT 84401
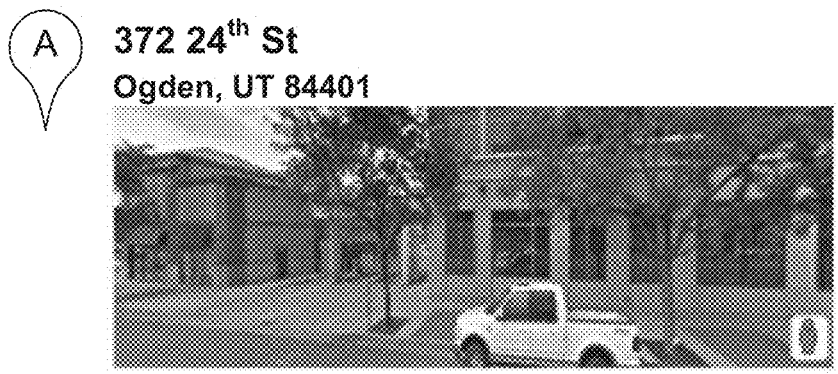
*FIG. 17*

PRESENTING A DOCUMENT TO A REMOTE USER TO OBTAIN AUTHORIZATION FROM THE USER

CROSS-REFERENCE TO RELATED APPLICATIONS

This application is a continuation-in-part of U.S. patent application Ser. No. 14/012,005 (the '005 application) which was filed Aug. 28, 2013 and which claims priority to U.S. Provisional Patent Application No. 61/700,250 filed Sep. 12, 2012.

The '005 application is also a continuation-in-part of U.S. patent application Ser. No. 13/731,942, which was filed on Dec. 31, 2012, which claims priority to U.S. Provisional Patent Application No. 61/700,250 which was filed on Sep. 12, 2012.

This application is also a continuation-in-part of U.S. patent application Ser. No. 14/080,292, filed Nov. 14, 2013, which is a continuation-in-part of U.S. patent application Ser. No. 13/731,879 which was filed on Dec. 31, 2012.

BACKGROUND

Mobile computing devices such as smart phones and tablets are becoming commonplace in today's world. Such devices enable users to perform transactions in virtually any location. For example, using a smart phone, a user can make online purchases or purchases over the phone from any remote location having an appropriate connection. In many transactions, the user's authorization to enter into a transaction can be received over the phone or by clicking a checkbox in a webpage.

In spite of the mobility provided by such devices, many transactions still cannot be performed by a remote user. Some transactions (e.g. recurring payments) often cannot be completed without receiving a signature from the user. For this reason, to authorize some transactions, remote users are required to mail or fax a signed paper to the entity performing the transaction. Examples of transactions that require a user's signature include authorization to make recurring debits from the user's account for repaying a loan or authorization to make recurring charges to a user's credit card for a subscription service.

Printing, signing, and returning a document can be a burdensome requirement for many users. Accordingly, when a signature is required for authorizing a transaction remotely, users are not able to fully benefit from the mobility provided by their portable devices.

BRIEF SUMMARY

The present invention extends to systems, methods, and computer program products for receiving a signature (or other type of verification or confirmation) from a remote user. The present invention enables a merchant to send a signature request over a network to any device having a browser and touch screen or other means for receiving user input. An input area is displayed within the browser on the user's device. When the user inputs a signature, the signature can be routed over a network back to the merchant to provide authorization for a transaction.

In one embodiment, the present invention is implemented as a method for providing a request for user input to a client computing device over a network. A first request is received from a merchant computing system. The first request requests that a second request for user input be sent to a client computing device. The first request includes contact information for a user of the client computing device. The second request for user input is then generated. The second request for user input is sent to the client computing device using the contact information. The second request also requests authenticating information to authenticate the user input. The user input is received from a user of the client computing device. The authenticating information is received from the client computing device. User interface code is generated which when rendered causes the user input received from the client computing device to be displayed on the merchant computing system. The user interface code is sent to the merchant computing system to enable the merchant computing system to render the user interface code to display the user input in conjunction with account information for the user on the merchant computing system such that the user input can serve as authorization from the user for a transaction to the account.

In another embodiment, the present invention is implemented as a method for requesting user input from a remote user over a network. Account information of a user is received for performing a transaction. Contact information of the user is also received. A request for user input is sent to a client computing device of the user to authorize the transaction. The request is sent using the contact information of the user. The request identifies one or more types of authenticating information that the user is to provide to authenticate the user's identity. The user input is received over the network. A user interface is generated. The user interface includes the account information in conjunction with the user input such that the user input serves as authorization from the user to perform the transaction. The transaction is then performed using the account information and the user input.

In another embodiment, the present invention is implemented as a method for providing a request for user input to a client computing device over a network. A first request is received from a merchant computing system. The first request requests that a second request for user input be sent to a client computing device. The first request includes contact information for a user of the client computing device and a document to be presented to the user, the document representing an agreement that the user has made or will make. The second request for user input is generated and sent to the client computing device using the contact information. The second request includes the document to be presented to the user. The user input is received from a user of the client computing device. The user input comprises an authorization for the performance of the agreement. The user input is sent to the merchant computing system to enable the merchant computing system to cause the performance of the agreement authorized by the user input.

In another embodiment, the present invention is implemented as a method for providing a request for user input to a client computing device over a network. Contact information for a user of a client computing device and a document to be presented to the user are received from a merchant computing system. The document represents an agreement that the user has made or will make. A message is sent to the client computing device. The message contains a link which when selected causes the server computing system to send a first user interface to the client computing device, the first user interface including a request for authentication information. In response to receiving the authentication information from the client computing device, a second user interface is sent to the client computing device. The second user interface includes the document. A third user interface is sent to the client computing device. The third user interface includes a request for user input. The user input comprises an authorization for the performance of the agreement. In response to receiving the user input from the client computing device, the user input is sent to the merchant computing system to enable the merchant computing system to cause the performance of the agreement authorized by the user input.

This summary is provided to introduce a selection of concepts in a simplified form that are further described below in the Detailed Description. This Summary is not intended to identify key features or essential features of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates an exemplary user interface that can be displayed by a merchant computing system to allow a signature to be requested from a remote user;

FIG. 5 illustrates the user interface of FIG. 2 after it has been updated to include an image of a check;

FIG. 6 illustrates the user interface of FIG. 2 after it has been updated to include an image of a credit card receipt;

FIG. 7 illustrates the user interface of FIG. 5 after a signature has been received;

FIG. 8 illustrates the user interface of FIG. 6 after a signature has been received;

FIG. 12 illustrates a flowchart of an exemplary method for remotely providing user input to authorize a transaction;

FIG. 17 illustrates an example audit report.

DETAILED DESCRIPTION

Figure 1:
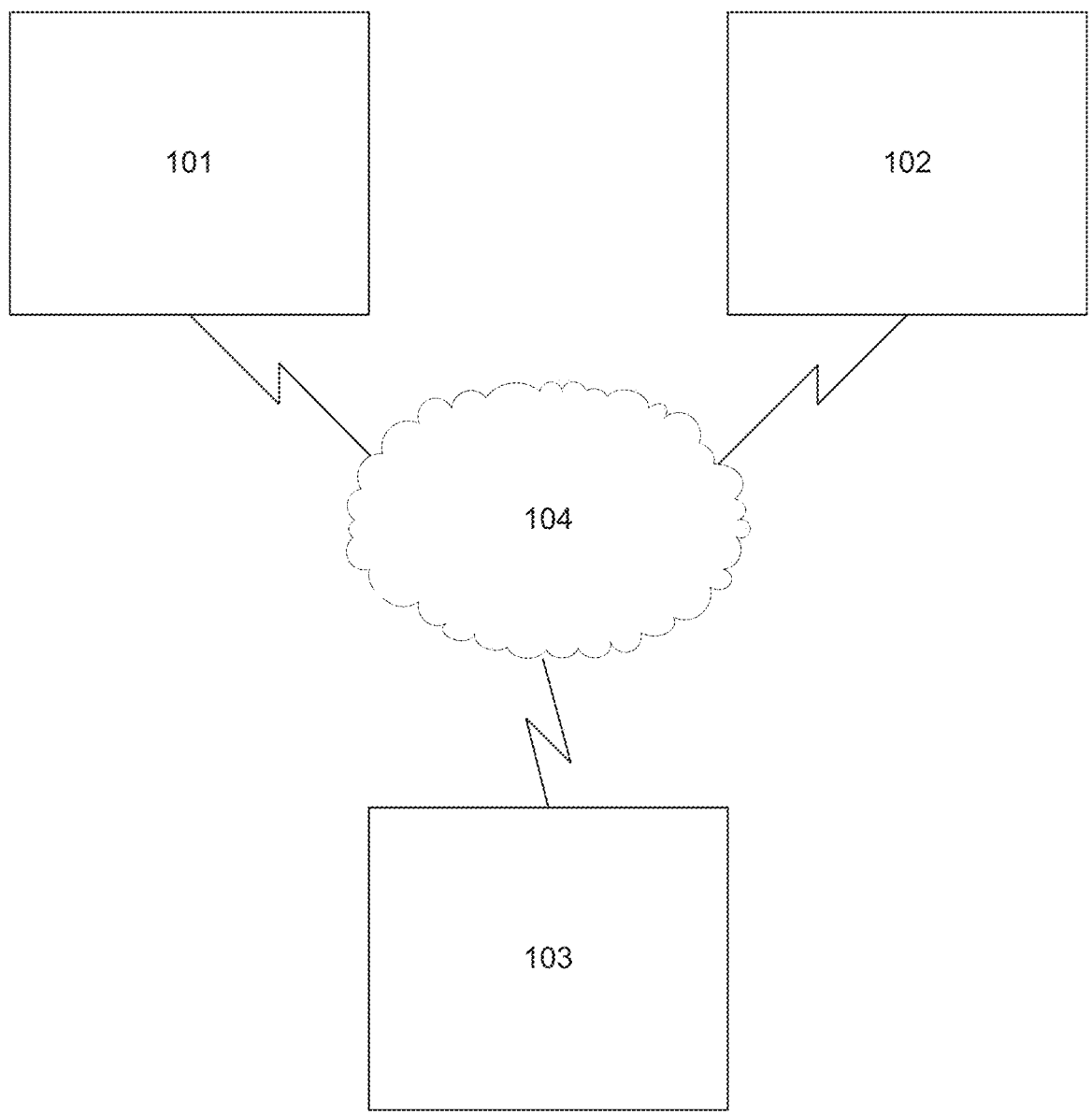
FIG. 1 illustrates an exemplary computer environment in which the present invention can be implemented.

The present invention extends to systems, methods, and computer program products for receiving a signature (or other type of verification or confirmation) from a remote user. The present invention enables a merchant to send a signature request over a network to any device having a browser and touch screen or other means for receiving user input. An input area is displayed within the browser on the user's device. When the user inputs a signature, the signature can be routed over a network back to the merchant to provide authorization for a transaction.

In one embodiment, the present invention is implemented as a method for providing a request for user input to a client computing device over a network. A first request is received from a merchant computing system. The first request requests that a second request for user input be sent to a client computing device. The first request includes contact information for a user of the client computing device. The second request for user input is then generated. The second request for user input is sent to the client computing device using the contact information. The second request also requests authenticating information to authenticate the user input. The user input is received from a user of the client computing device. The authenticating information is received from the client computing device. User interface code is generated which when rendered causes the user input received from the client computing device to be displayed on the merchant computing system. The user interface code is sent to the merchant computing system to enable the merchant computing system to render the user interface code to display the user input in conjunction with account information for the user on the merchant computing system such that the user input can serve as authorization from the user for a transaction to the account.

In another embodiment, the present invention is implemented as a method for requesting user input from a remote user over a network. Account information of a user is received for performing a transaction. Contact information of the user is also received. A request for user input is sent to a client computing device of the user to authorize the transaction. The request is sent using the contact information of the user. The request identifies one or more types of authenticating information that the user is to provide to authenticate the user's identity. The user input is received over the network. A user interface is generated. The user interface includes the account information in conjunction with the user input such that the user input serves as authorization from the user to perform the transaction. The transaction is then performed using the account information and the user input.

In another embodiment, the present invention is implemented as a method for providing a request for user input to a client computing device over a network. A first request is received from a merchant computing system. The first request requests that a second request for user input be sent to a client computing device. The first request includes contact information for a user of the client computing device and a document to be presented to the user, the document representing an agreement that the user has made or will make. The second request for user input is generated and sent to the client computing device using the contact information. The second request includes the document to be presented to the user. The user input is received from a user of the client computing device. The user input comprises an authorization for the performance of the agreement. The user input is sent to the merchant computing system to enable the merchant computing system to cause the performance of the agreement authorized by the user input.

In another embodiment, the present invention is implemented as a method for providing a request for user input to a client computing device over a network. Contact information for a user of a client computing device and a document to be presented to the user are received from a merchant computing system. The document represents an agreement that the user has made or will make. A message is sent to the client computing device. The message contains a link which when selected causes the server computing system to send a first user interface to the client computing device, the first user interface including a request for authentication information. In response to receiving the authentication information from the client computing device, a second user interface is sent to the client computing device. The second user interface includes the document. A third user interface is sent to the client computing device. The third user interface includes a request for user input. The user input comprises an authorization for the performance of the agreement. In response to receiving the user input from the client computing device, the user input is sent to the merchant computing system to enable the merchant computing system to cause the performance of the agreement authorized by the user input.

Example Computing Environment

Embodiments of the present invention may comprise or utilize a special purpose or general-purpose computers including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, smart phones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In the following description, the present invention will be described primarily using an example of obtaining a signature from a remote user using a touch screen device. However, it is emphasized that the present invention is not limited to obtaining a signature, but can be used to obtain any type of input from a remote user. Further, the description also primarily describes the use of email or text message for sending requests to a client computing device. However, it is also emphasized that any communication format that allows a link to be included in the message content can equally be used as described below.

FIG. 1 illustrates an exemplary computer environment 100 in which the present invention can be implemented. Computer environment 100 includes server system 101, merchant computing system 102, and client computing device 103 which are each connected via a network 104. In a typical implementation, network 104 comprises the internet although other network connections could be used to interconnect any of the systems of computer environment 100. Client computing device 103 represents any device having a browser and a touch screen or other means for receiving a user's signature. For example, client computing device 103 may comprise a smart phone or tablet with a touch screen that allows a user to use his finger to provide a signature. Client computing device 103 could also comprise a desktop or laptop computer without a touchscreen in which case the user can use a mouse or other input device to provide a signature.

Merchant computing system 102 represents one or more servers or other computing devices that a merchant uses to send requests to server system 101 over network 104. These requests can include requests that server system 101 generate and send a signature request to client computing device 103.

Server system 101 represents one or more computing devices used to receive requests from merchant computing system 102, and to send requests for signatures to client computing device 103 and receive signatures back from client computing device 103. Server system 101 can comprise one or more server computing devices or a cloud of server computing systems.

Accordingly, server system 101 acts as an intermediary between merchant computing system 102 and client computing device 103 for requesting and obtaining a signature and/or account information from a user of client computing device 103. Server system 101 can employ any suitable interface for receiving requests from merchant computing system 102. In one particular embodiment, a Simple Object Access Protocol (SOAP) interface can be provided to allow merchants to make requests for signatures and receive signatures using SOAP requests and responses respectively. In this manner, server system 101 can provide a third party tool for obtaining signatures that is easily incorporated into any merchant's business processes.

Although FIG. 1 illustrates that a merchant system uses an intermediary server system to send requests to the client computing device, the invention can also be implemented when the merchant system directly communicates with client computing device. In such cases, merchant system can be configured to perform the functionality described as being performed by the server system in the following description.

Obtaining Authorization Input from a Remote User

FIG. 2 illustrates an exemplary user interface 200 that can be displayed by merchant computing system 102 to an employee to allow the employee to request a signature from a remote user of client computing device 103. For example, the employee may be communicating with the user to establish a subscription or other agreement requiring the user to make recurring (e.g. monthly) payments. Such agreements may require a signature from the user to authorize monthly payment, such as in the form of a monthly ACH debit or credit card charge.

Although this example refers to an employee requesting a signature, the merchant computing system 102 can generate requests automatically. Also, the merchant computing system 102 can request signatures from one or many different remote users (i.e. merchant computing system 102 can make batch requests for signatures). For example, merchant computing system 102 can send a batch request to server system 101 requesting signatures or other user input from many different users.

In prior approaches, the user would provide a signature generally by printing, signing, and returning a form via mail or fax. Such approaches are burdensome. The present invention enables a signature to be quickly and easily obtained from a user by employing server system 101.

User interface 200 represents an embodiment where the merchant is attempting to receive a signature to authorize an ACH debit. Accordingly, user interface 200 includes fields 201 for receiving user information including the user's name, a bank routing number, an account number, a check number, an account type, and an amount. Fields 201 are exemplary of information that may be required for an ACH transaction; however, not all information shown is required in all embodiments of the present invention.

User interface 200 also includes fields 202, 203 for receiving a mobile phone number or an email address for the user. The employee can input either or both the user's phone number or email address. Once input, the employee can select request signature button 204 which causes a request to be sent to server system 101 requesting that a signature request be generated and sent to a client computing device. The signature request sent to the client computing device can be in any format capable of including a hyperlink as described below. For example, the signature request can be a text message, an email, an instant message, or a social networking (e.g. Twitter, Facebook, Google +, etc.) message. Some or all of the information input into fields 201 can also be included in the request sent to server system 101.

Although not shown in FIG. 2, user interface 200 can also provide one or more additional fields for receiving other information such as free form text. Any or all of this information can be included in the request sent to server system 101 for subsequent inclusion in a message sent to a client computing device.

As stated above, the request sent to server system 101 can be in the form of a SOAP request. As such, logic for making the request can be easily incorporated into a merchant's existing systems or included in new systems designed to obtain signatures from a remote user.

When server system 101 receives the request from merchant computing system 102, it can generate a message to send to the user in accordance with the information supplied in the request. For example, if the request indicates a mobile phone number, a text message can be generated, whereas if the request indicates an email address or Facebook username, an email or Facebook communication respectively can be generated. The generated message can include any combination of the information provided in the request received from merchant computing system 102 as well as other information provided by server system 101. For example, the generated message can include free form text provided by merchant computing system 102 that can be displayed to the user of client computing device 103.

Figure 3:
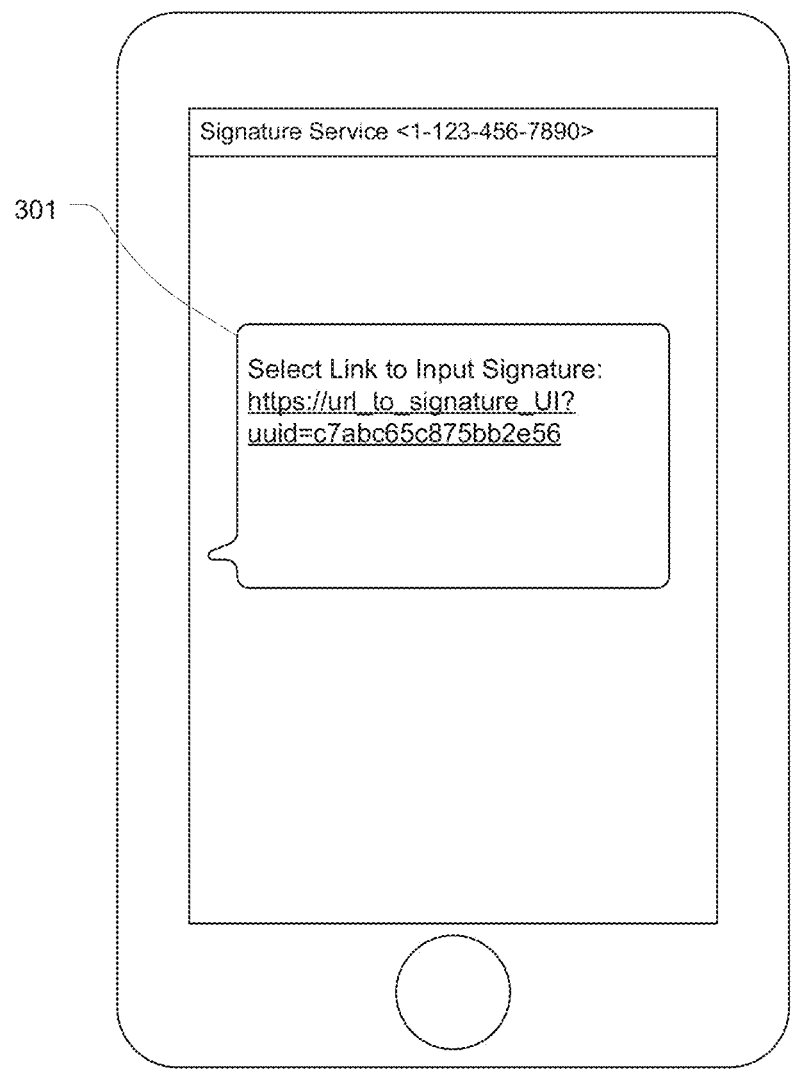
FIG. 3 illustrates an example text message displayed on a smart phone that includes a link to an interface for inputting a signature.

The generated message can include a link to a service for obtaining the signature from the user using client computing device 103. For example, FIG. 3 illustrates an example text message 301 displayed on a smart phone that includes a link that the user can select to receive an interface (e.g. a web page) for inputting a signature. In some embodiments, the message can have an associated expiration time, after which the message can no longer be used to provide a signature (e.g. the link in the message becomes invalid after the expiration time).

Figure 4A:
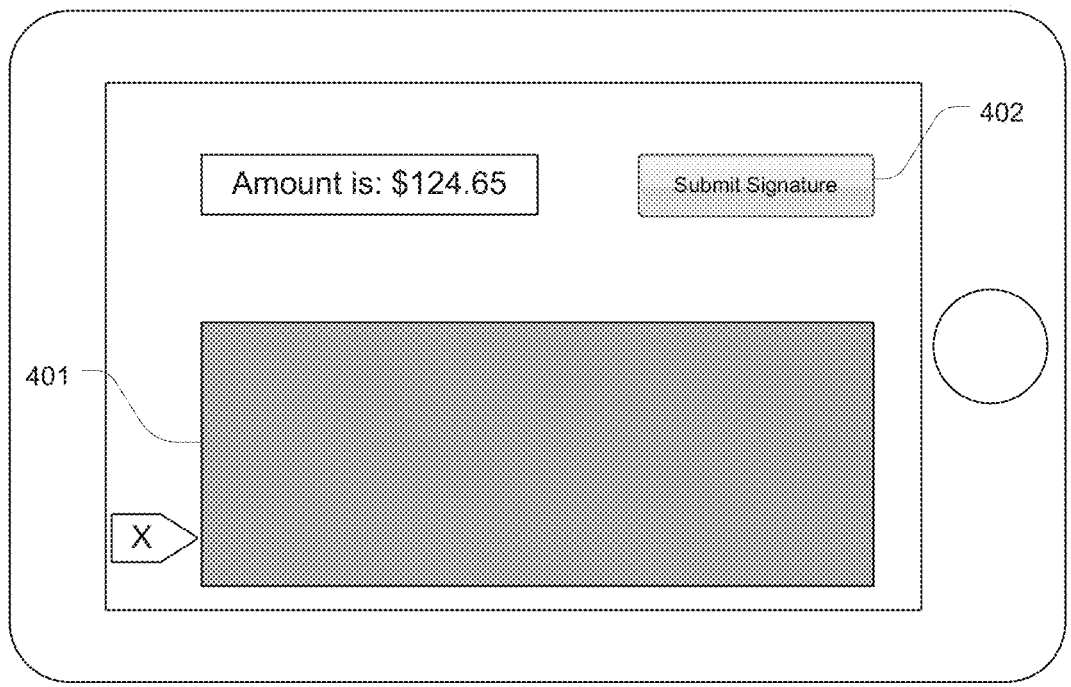
FIGS. 4A-4B illustrate an exemplary user interface that can be displayed on a client computing device to receive a signature from a user.
Figure 4B:
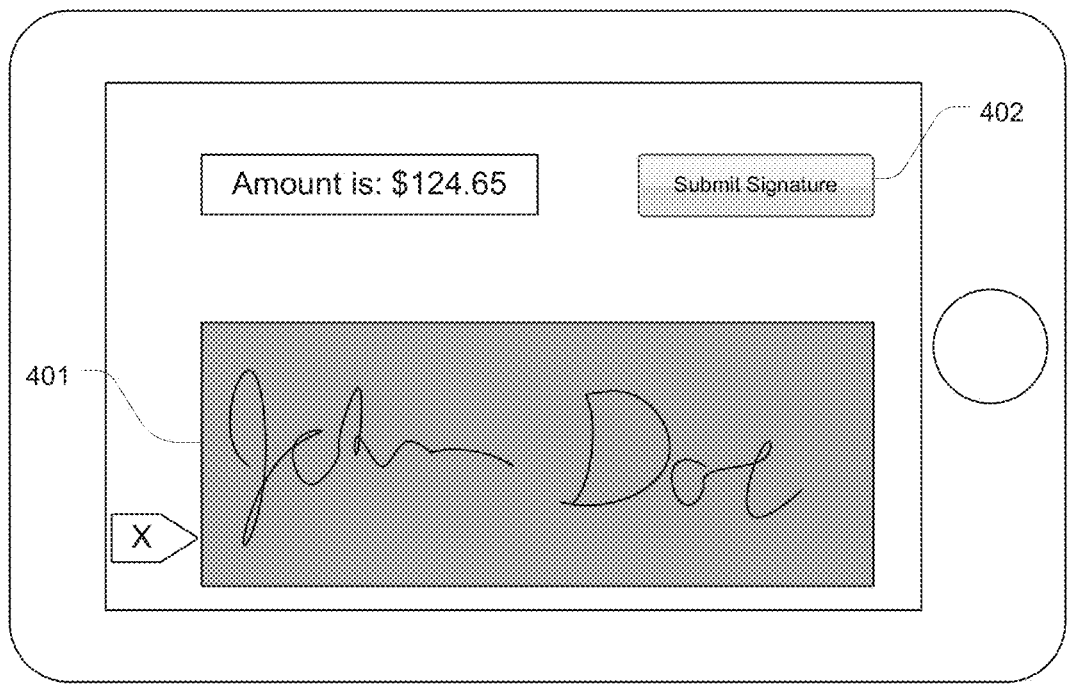

FIG. 4A illustrates a user interface 400 that can be displayed to the user on client computing device 103 to allow the user to input a signature. User interface 400 comprises a signature area 401 in which the user signs his name. In some embodiments, user interface 400 is browser based. Because a browser based approach can be used, client computing device 103 does not need any additional software beyond what is typically included in such devices (e.g. a standard browser) to input a signature. User interface 400 can also include other information beyond what is shown in FIGS. 4A and 4B. For example, user interface 400 can include free form text provided in the request received from merchant computing system 102.

In some embodiments, signature area 401 can be configured to appear as a check, receipt, document, or other instrument which a user may sign to provide authorization for some action. For example, if the user is providing authorization to make periodic deductions from his checking account, the signature area 401 can appear as a check having the user's bank routing number and account number. In such cases, the account information (e.g. bank routing number, checking account number, credit card number, other account number or identifier, transaction amount, action to be authorized, etc.) to be displayed within signature area 401 can be provided by merchant computing system 102 (whether prior to or with the request for user input) to allow server system 101 to generate the appropriate display.

Once the user has input his signature as shown in FIG. 4B, he can select the process button 402 which captures the signature and causes the signature to be sent back to server system 101 which routes the signature back to merchant computing system 102 (e.g. as a SOAP response). In a typical implementation, a user inputs his signature using his finger on the touch screen. However, the user can also input his signature in other ways such as by using a stylus, mouse, or other input device.

Once merchant computing system 102 has received the signature of the user, merchant computing system 102 can route the appropriate information to a third party payment processor (e.g. a clearinghouse). Also, a receipt or other evidence of the submission of the signature/input can be provided back to the client computing device 103 via any communication means (e.g. email, text, social media communication, etc.). This receipt can act as a confirmation to the user that the user provided the requested input.

Figure 5:
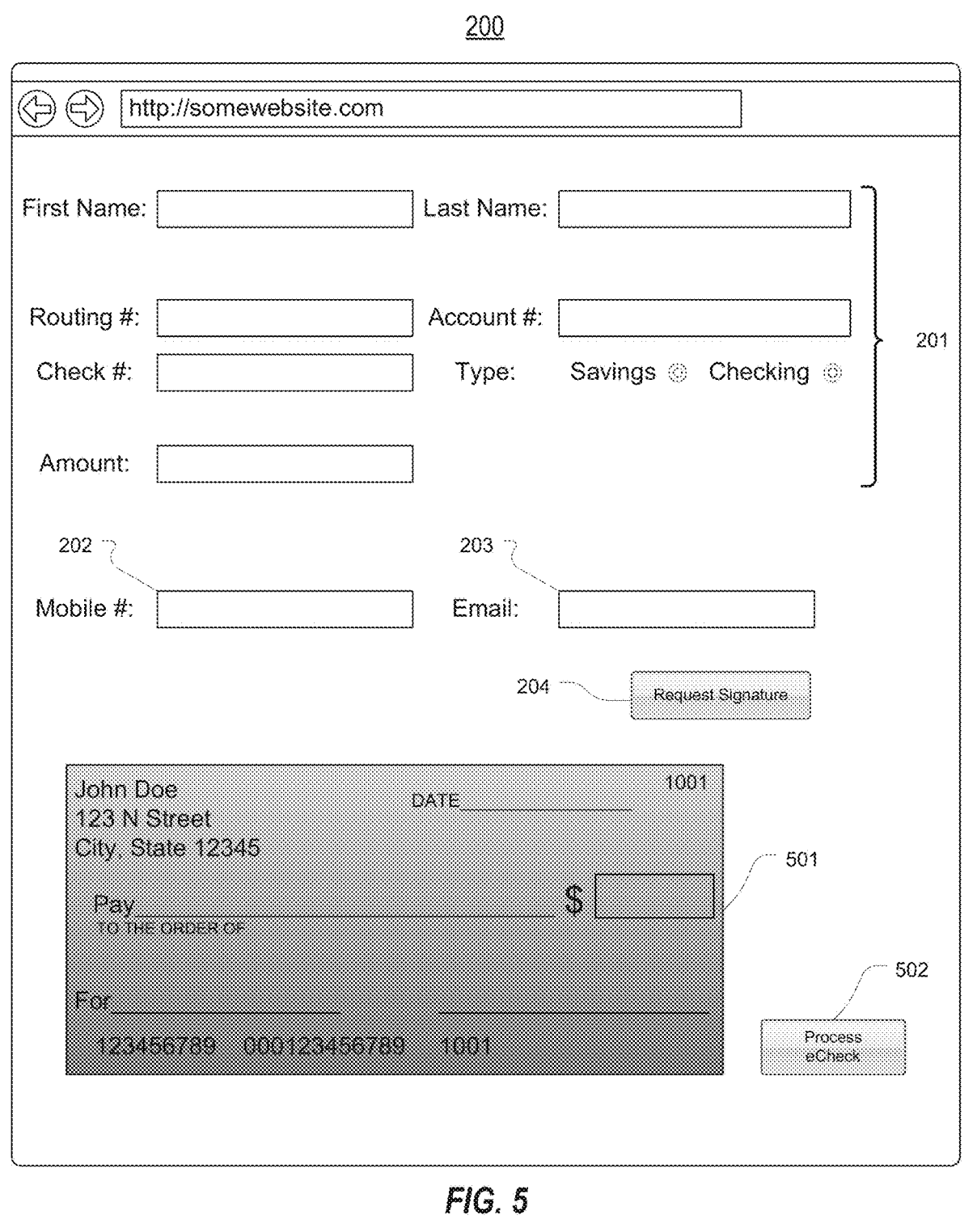

In some embodiments, user interface 200 can generate a display of a check, credit card receipt, or other instrument to represent a transaction to be performed. For example, FIG. 5 illustrates that user interface 200 has been updated to include an image of a check 501. The image of the check can be generated based on the information input into fields 201. For example, when the employee selects the request signature button 204, the information input into field 201 can be accessed to populate the routing number, account number, check number, etc. into the image of the check.

In some embodiments, the image of the check (or other type of image such as a credit card receipt) can be generated by server system 101 using the information input into field 201, and returned to merchant computing system 102 for display within user interface 200. In this manner, the logic required to implement user interface 200 on merchant computing system 102 can be further simplified, and can even allow user interface 200 to be browser based.

FIG. 6 illustrates user interface 200 when a signature is being requested to authorize a credit card transaction. As shown, user interface includes an image of a credit card receipt 601 that includes a portion of the credit card number, the expiration date, the amount, etc.

FIGS. 7 and 8 illustrate user interface 200 after the signature has been received to authorize a check and credit card transaction respectively. As shown in each figure, the signature has been added to user interface 200 to indicate to the employee that the user's signature has been received, and the transaction is ready to be submitted to the third party payment processor. As shown in FIG. 7, the signature can be added directly to the image of the check on the signature line as if the user had directly signed the check. Similarly, in FIG. 8, the signature is shown as having been added to the receipt. A process eCheck button 502 and a process credit card button 602 can also be provided for submitting the information once a valid signature has been obtained.

Although the above examples of obtaining a signature have related to financial transactions, the present invention can equally be used to obtain a signature for any type of transaction or for any other purpose. For example, the present invention can be used by a courier service such as FedEx or UPS to obtain a signature to authorize a package to be left on a person's doorstep even when the person is not home. Similarly, the present invention can be used to obtain consent from a user for any other purpose. In other words, with only an identifier of a user (e.g. phone number, email address, social networking identifier, etc.), a merchant can make a request, via server system 101, for a signature for any purpose.

For example, a courier service could use server system 101 to make batch requests for signatures to approve of leaving packages at customers' doors. When an approval is received from a customer, the approval can be routed to a delivery person to inform the delivery person that the corresponding package can be left at the door. Similarly, server system 101 can be used to make batch requests for authorizations to charge customers' accounts for a service. As each authorization is received, the corresponding account can be charged.

Further, although the above description uses the example of obtaining a signature from a user, the present invention can also be used to receive other input from a user. For example, if a merchant requires that a user input a pin or other confirmation input, the present invention can be used to send a request for such input. In such cases, rather than (or in addition to) displaying signature area 401 when the user selects the link on client computing device 103, another area can be displayed for receiving the desired input (e.g. a form for entering a password, pin, or other identifier, or a button or other UI element for providing confirmation).

Figure 9:
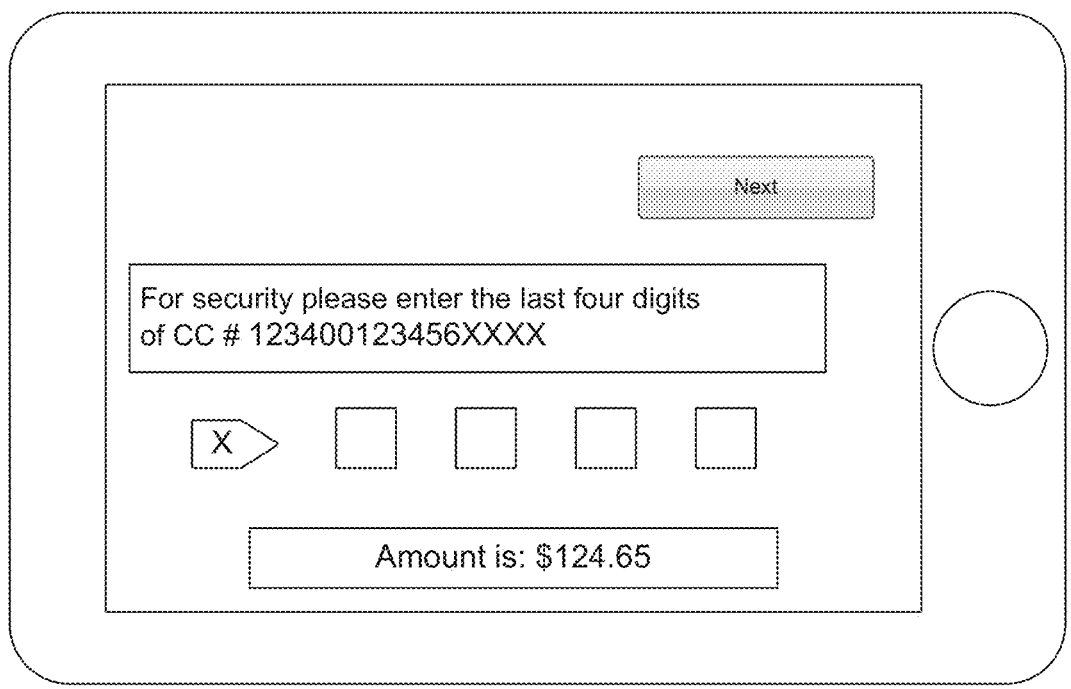
FIG. 9 illustrates an exemplary authentication user interface that can be displayed on a client computing device to perform user authentication.

FIG. 9 illustrates how server system 101 can require authentication prior to providing a signature user interface to client computing device 103. For example, after the user selects the link included in the message (e.g. text message 301), server system 101 can cause authentication user interface 900 to be displayed to the user. Authentication user interface 900 can include sufficient information to identify the transaction for which the user is providing his signature.

Authentication user interface 900 can prompt the user to provide authenticating information to authenticate the user. As shown, authentication user interface 900 can prompt the user to provide the last four digits of the routing number of the user's checking account. Other types of authenticating information can also be requested such as other account information (e.g. a pin, last four digits of credit card number, a portion of a tracking number for a package, etc.), personal information (e.g. the user's birth date or social security number), etc.

Authentication user interface 900 can provide the benefit of ensuring that the user receiving the message from server system 101 is the intended recipient. For example, if the employee of the merchant input appropriate account information into fields 201 of user interface 200, but mistyped the phone number or email address into fields 202, 203 (thereby causing the message to be sent to an incorrect recipient), authentication user interface 900 can successfully prevent an unintended recipient from authorizing a transaction.

Server system 101 can be configured to notify merchant computing system 102 of a failure in the authentication process to allow the merchant to verify the information input to user interface 200 and resend a request if necessary. For example, the failure notification can be sent after a specified number of failed attempts by the user to input appropriate information to authentication user interface 900, after a specified duration of time without receiving authentication information, etc.

In some embodiments, authentication user interface 900 can also include means for the user to notify merchant computing system 102 that the signature request has been sent to the incorrect user or that the displayed information is incorrect. For example, a button, field, or other user interface element can be included that allows a user to send a notification back to merchant computing system 102 without providing a signature.

In some embodiments, to facilitate the use of the present invention, user interface 400 for receiving a user signature and authentication user interface 900 for authenticating a user can be provided within a standard web browser. In other words, these user interfaces can be browser based such that no additional hardware or software is required to be installed on client computing device 103 to provide a signature remotely.

To enhance the security of the user's information and signature, the present invention can employ encryption techniques to secure the information transmitted between the various computing systems. For example, the signature captured by client computing device 103 can be transmitted securely from client computing device 103 to server system 101 such as by using HTTPS or another secure protocol. Also, the signature or other user information can be stored on server system 101 as a secure token using AES 256 encryption or another type of encryption.

Accordingly, the present invention facilitates obtaining a signature from a remote user. Any network connected client computing device having a touch screen and a browser can be used to provide a signature remotely to authorize a transaction. In this manner, a signature can be provided for transactions requiring a signature as well as for transactions were a signature is desired but not required.

By providing a browser based solution for obtaining a signature, no additional software or hardware is required to be installed on a client computing device. For example, a typical client computing device can receive a text message or email which provides a link to a web page in which the signature can be input.

The present invention further simplifies the signature obtaining process by providing an interface (e.g. a SOAP interface) that any third party merchant can access to send requests for signatures. In other words, if a merchant desires to obtain signatures from remote users over the internet, the merchant need only adapt its business processes to the interface provided by server system 101 to make and receive appropriate SOAP requests and responses. Of course, SOAP is one particular way of implementing the present invention, but other protocols could also be used in a similar manner.

Presenting a Document During a Request for Authorization

In some embodiments, the present invention may also enable the display of a document during a request for authorization. For example, if the request is for authorization to make a payment, the process may include displaying a bill to which the payment will be applied. Similarly, if the bill is recurring, the authorization can apply to a current payment as well as all future payments. In such cases where a payment is to be authorized and the merchant does not yet have payment information, the process can include displaying a user interface for receiving the payment information from the user. Alternatively, if the request is for authorization for a contract without any corresponding payment, the process may include displaying the contract. Accordingly, the authorization process can include any combination of displaying a document, an authorization user interface, and a payment information user interface. Various example sequences of user interfaces that can be displayed during an authorization process are described below with respect to FIGS. 13-16.

Figure 13:
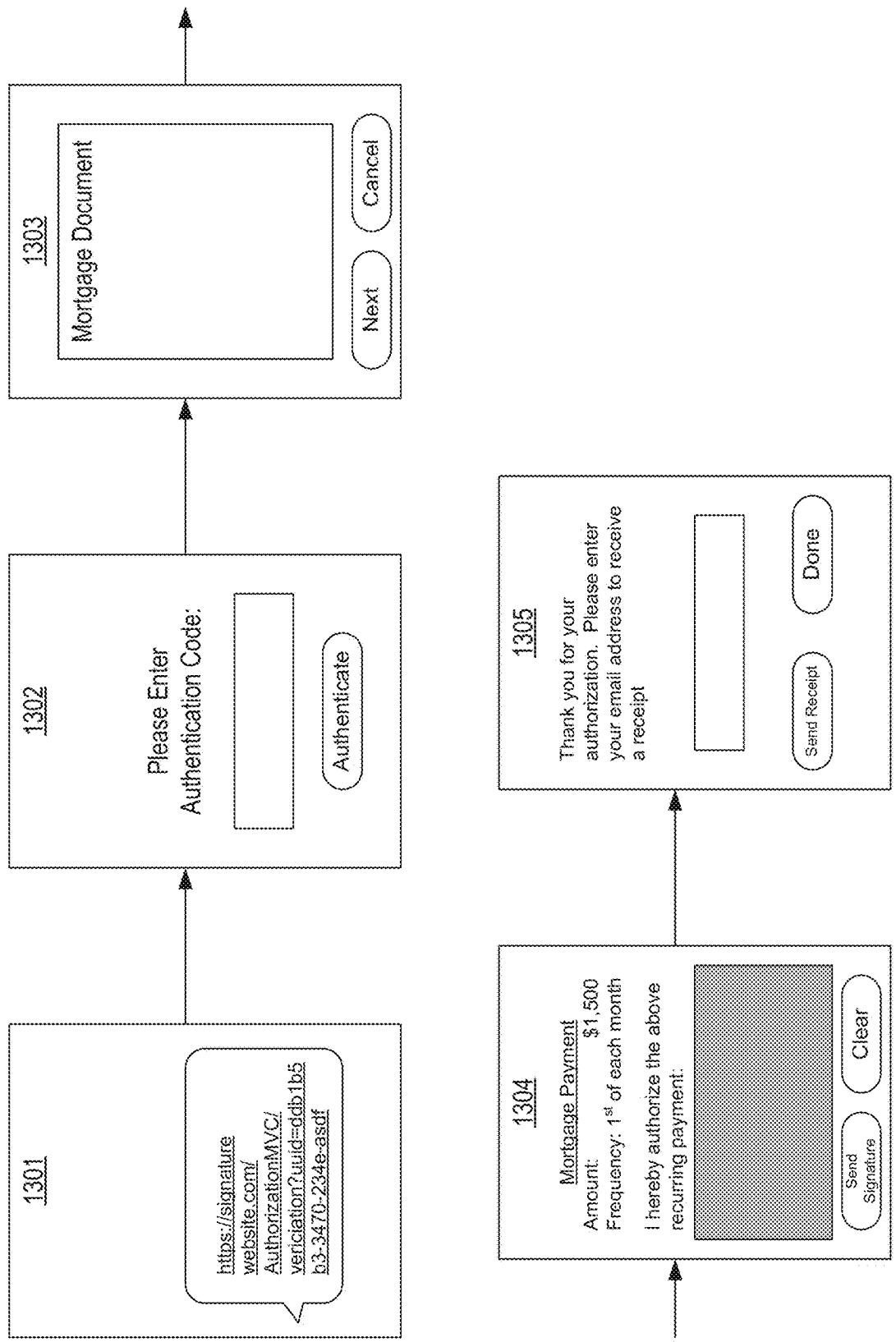
FIGS. 13-16 each illustrate a sequence of user interfaces that can be displayed on a client computing device to present a document to the user.

FIG. 13 illustrates an example sequence of user interfaces 1301-1305 that can be displayed during a request to receive authorization to make a mortgage payment. In this sequence, it is assumed that merchant computing system 102 already has the user's payment information and therefore does not need to request it.

User interface 1301 displays a text message that includes a link which when selected opens user interface 1302. As described above, in some embodiments, user interface 1302 (as well as user interfaces 1303-1305) can be browser based. User interface 1302 prompts the user to input an authentication code. This authentication code is an example of the additional information that can be obtained from the user to authenticate the user as is described below in the section titled "Additional Features to Enhance The Authenticity of User Input." Other types of information can be obtained in place of or in addition to the authentication code to authenticate the user as is further described below.

If the user provides the appropriate authentication code (e.g. a portion of a social security number, a portion of payment information, a shared secret, etc.), user interface 1303 can be displayed. User interface 1303 comprises a mortgage document representing a mortgage payment that the user has agreed or will agree to pay. User interface 1303 can display the mortgage document in various ways including as a PDF, HTML, XML, or text.

After the user has had the opportunity to review the mortgage document, he can select the Next button which causes user interface 1304 to be displayed. User interface 1304 comprises a signature area in which the user can provide a signature to authorize a recurring payment using payment information already accessible to merchant computing system 102. In some embodiments, a representation of the payment information accessible to merchant computing system 102 can be displayed within user interface 1304 or another user interface to allow the user to verify the payment information.

After the user's signature is received, user interface 1305 can be displayed to allow the user to request a receipt for the transaction. User interface 1305 includes a field for receiving an email address of the user. However, other types of addresses can also be provided such as a phone number for receiving the receipt as an MMS message. To summarize, FIG. 13 represents a process where the merchant presents a document to the user in order to receive authorization from the user to perform a transaction required by the document. A similar process can be performed when the merchant desires to receive a signature (or other form of authorization input) for an agreement that does not involve a concurrent payment. For example, a consent form, an EULA, or a purchase order could be presented in user interface 1303.

Figure 14:
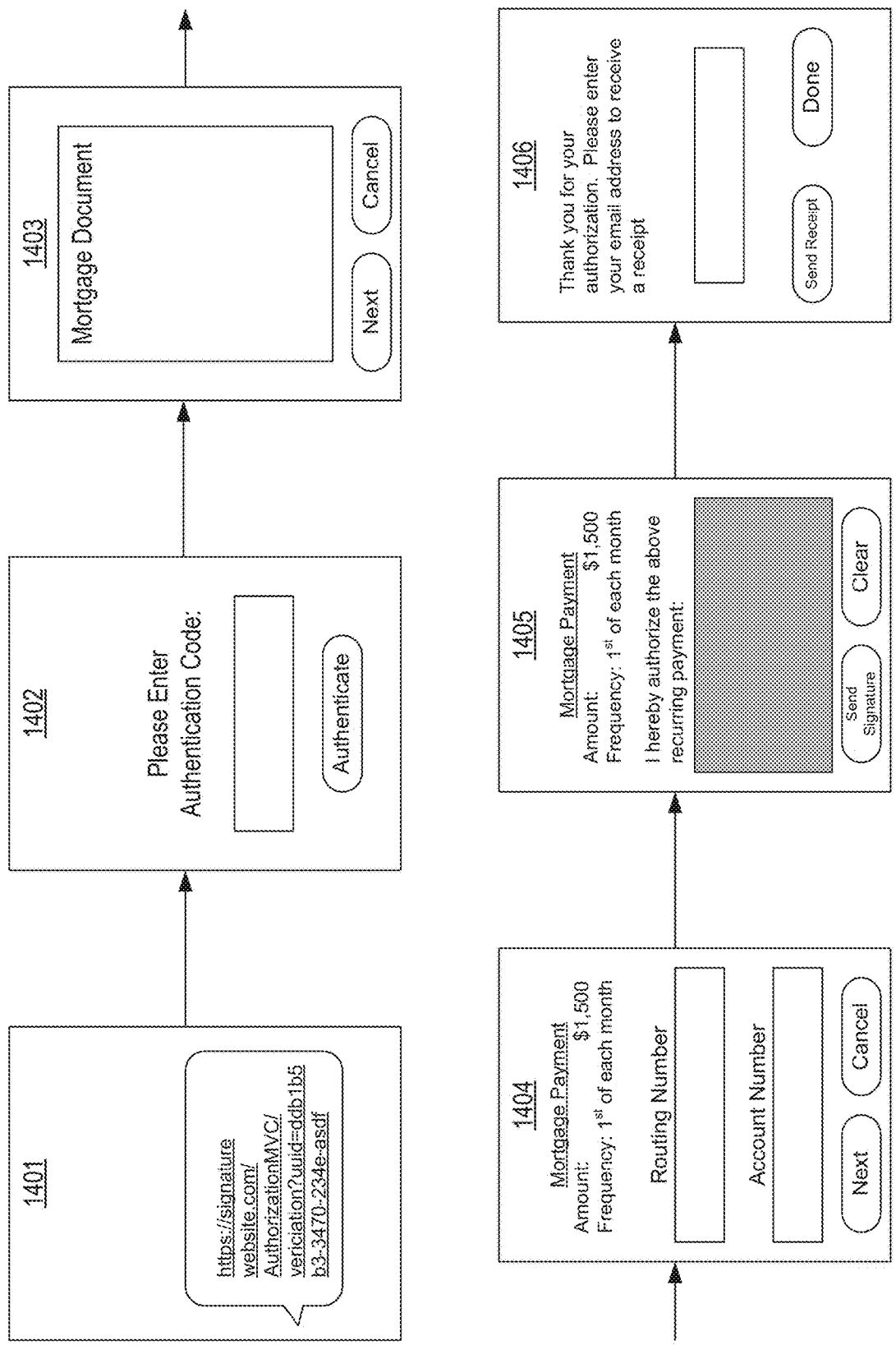

FIG. 14 illustrates another example sequence of user interfaces 1401-1406 that can be displayed during a request to receive authorization to make a mortgage payment. The sequence depicted in FIG. 14 differs from the sequence in FIG. 13 in that FIG. 14 includes a user interface (user interface 1404) for receiving payment information from the user. As shown, after the mortgage document is displayed to the user, user interface 1404 is displayed to request a bank routing number and an account number from the user that can be used to make recurring mortgage payments. After the user inputs the routing and account number, user interface 1405 is displayed to receive a signature from the user to authorize the recurring payments. Alternatively, user interface 1405 could display fields for receiving other types of authorization input from the user as described above.

Figure 15:
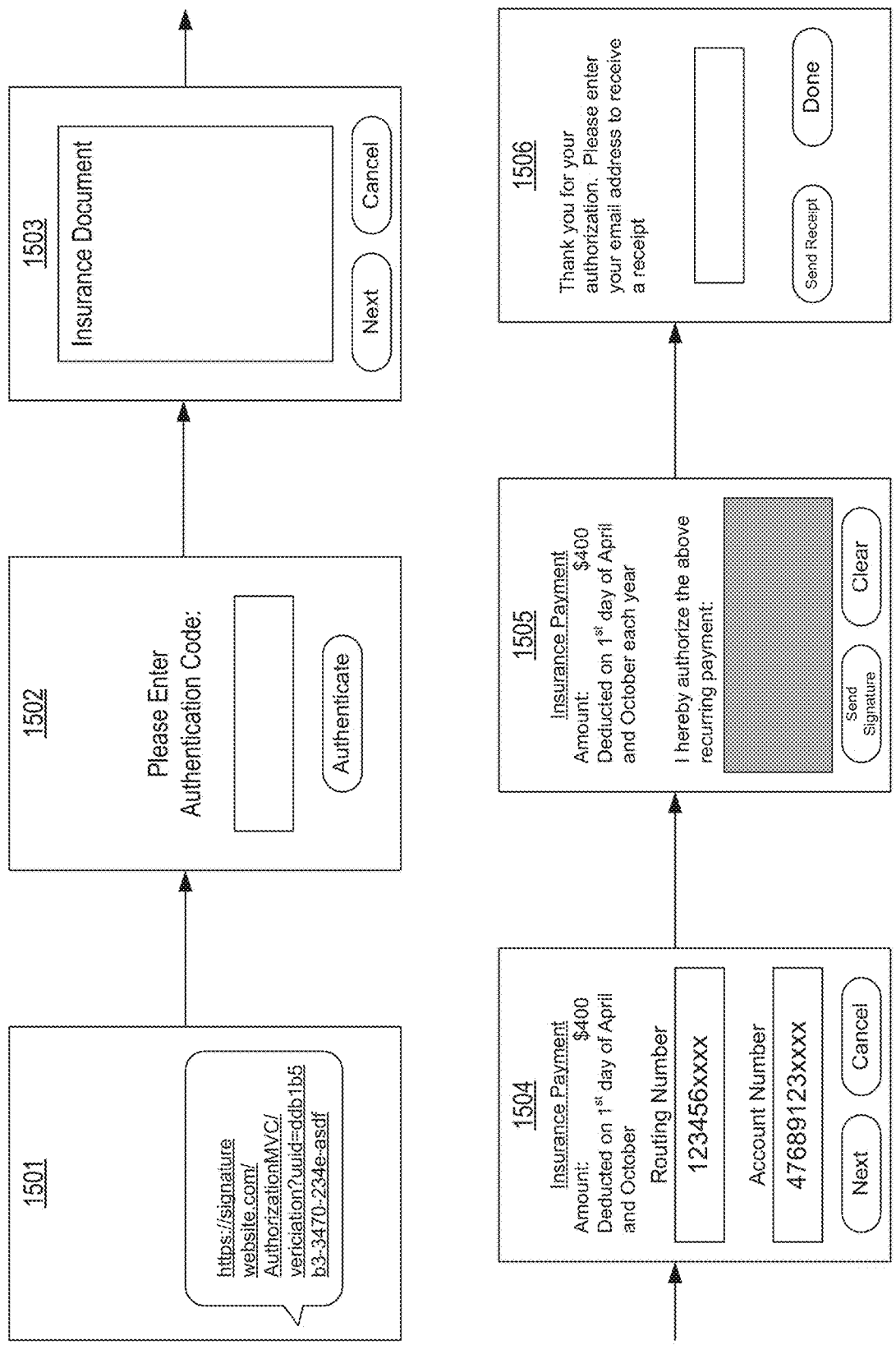

FIG. 15 illustrates another example sequence of user interfaces 1501-1506 that can be displayed during a request to receive authorization to make an insurance payment. FIG. 15 is similar to FIG. 14 except that in FIG. 15 user interface 1504 is prepopulated with the user's payment information. Accordingly, FIG. 15 can represent a scenario where merchant computing system 102 already has the user's payment information but wants to receive verification from the user that the payment information should be used for the insurance payment.

Figure 16:
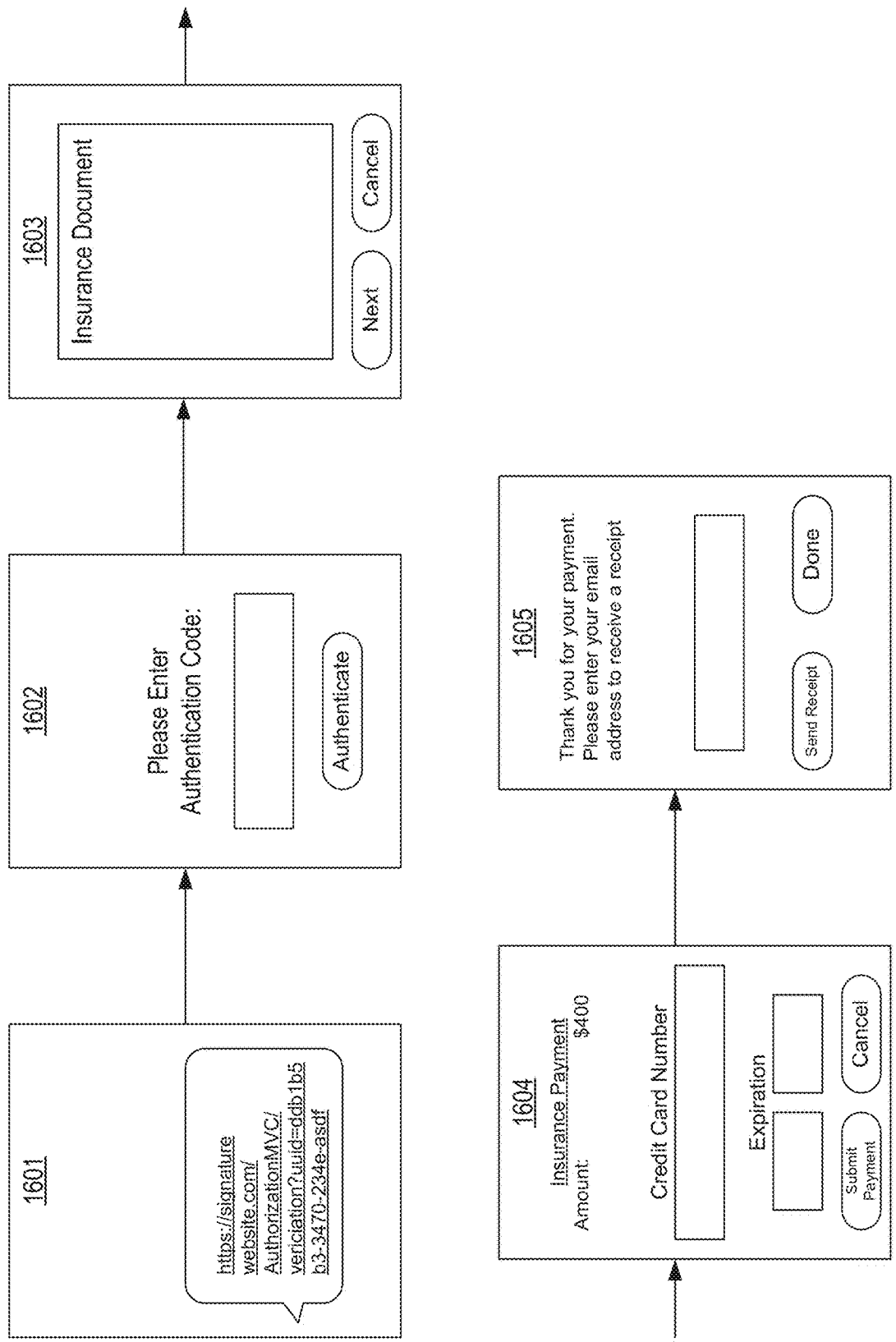

FIG. 16 illustrates another example sequence of user interfaces 1601-1605 that can be displayed during a request to receive authorization to make an insurance payment. In this sequence, the user is not prompted to provide a signature or other authorization input. Instead, the user is prompted to input payment information which in this example is a credit card number and an expiration date. FIG. 16 can therefore represent a scenario where the merchant does not need a signature or other authorization input to authorize the insurance payment. This may be the case when the payment is a one-time payment rather than a recurring payment.

Various types of information can be requested from the user in a user interface in conjunction with the display of a document to the user. For example, any information necessary to perform an ACH transaction can be requested including a bank routing number, an account number, a check number, etc. Similarly, any information necessary to perform a credit or debit card transaction can be requested including the card number, a card verification value (CVV), an expiration date, an address associated with the card, a desired payment amount, etc. Other types of information can also be requested when non-payment related documents are presented to the user. For example, if the document is a contract or agreement that requires an additional term or other information, the user can be requested to provide the additional term or other information. Accordingly, any type of information can be requested in conjunction with the display of a document to the user.

In some embodiments of the invention, the type of information that is requested from the user can be specified by merchant computing system 102 (e.g. via user interface 200 or a similar user interface). For example, in some embodiments, when merchant computing system 102 submits a request for a signature or other authorization input, any information that is not provided in the request (e.g. any information not entered into the fields shown in FIG. 2) can be requested from the user. In other embodiments, server system 101 may automatically request certain types of information based on the type of request being made.

Additional Features to Enhance the Authenticity of User Input

In some embodiments, it may be desirable to increase the amount of information obtained from the user to ensure the identity of the user which can be beneficial in minimizing the occurrence of fraud. For example, in addition to or in place of the authenticating information described with reference to FIG. 9 above, the present invention can obtain a location of the user, a picture of the user or of the user's identification card, or biometric information of the user.

In some embodiments, client computing device 103 can be used to obtain the location of the user while the user provides his signature or other requested input. For example, in GPS-enabled devices, GPS coordinates can be obtained and returned to server system 101 and/or merchant computing system 102 with the user's signature. When the user's location is provided with the user's signature, the location can be used to assess a strength of the authenticity of the user's signature. For example, if the user's location received with the user's signature is the same as the user's home address (which may be known by merchant computing system 102), there can be a high level of confidence in the authenticity of the user's signature (i.e. because it is highly unlikely that someone other than the user would have the user's computing device, possibly know the user's authenticating information, and be located at the user's residence).

In some embodiments, the user can be requested to take a picture of himself or of his identification card and include the picture with the signature or other input returned to merchant computing system 102. For example, when the user is asked to provide a signature or other input to authorize the merchant to perform an action, the user can also be asked to take a picture of himself (e.g. using a camera of client computing device 103). The picture of the user can be returned to server system 101 and/or merchant computing system 102 to be used as additional proof of the authenticity of the user's signature or other input.

In embodiments where a picture of the user is obtained, the system can be configured to collect and store pictures of each registered user of the system. In this way, when a particular user provides a picture in conjunction with user input, the provided picture can be compared to the picture stored for the user. For example, the two pictures can be displayed to an employee of the merchant for comparison prior to accepting the user input as authorization. Even if a picture is not stored for a user, a picture can still be requested and used to enhance the authenticity of user input such as by ensuring that the picture is of a person having the expected age, race, gender, etc. In some embodiments, the process of verifying a picture can be automated using facial recognition software.

In some embodiments, the user can be requested to take a picture of his identification card such as a driver's license or other form of identification. The picture of the identification card can be processed to retrieve information such as by performing optical character recognition (OCR) to obtain a user's name, birthdate, or address from the picture of the identification card. Any obtained information can be added to a user's account or compared to already-known information about the user. In some embodiments, a photo contained on the user's identification card can also be processed in a manner similar to a picture directly taken by the user as described above. In some embodiments, the user can be requested to provide a picture of himself in addition to a picture of the user's identification card. In such cases, a comparison of the two pictures can serve to verify the identity of the user.

Pictures can also be used to enhance the identity verification process by accessing metadata of the pictures. For example, many devices generate metadata when a picture is taken. This metadata can define a location where the picture was taken such as the GPS coordinates of a phone when the phone takes the picture. In some embodiments when a picture is submitted as part of the authentication process, the system can compare the location where the picture was taken as defined in the metadata of the picture to the current location of the client computing device.

If the locations do not match, or are not within a specified distance, the system can identify that the user of the client computing device may be an unauthorized user. For example, if an unauthorized user obtained a picture of the user (or the user's ID) and attempted to use the picture of the user to authenticate with the system as the user, and if the unauthorized user attempted to authenticate using the picture at a location that differed from the location where the picture was taken, the system can detect the differences in the two locations and can cause the authentication to fail. In this way, the system can ensure that the picture submitted for authentication is taken at the same location as the user's location during authentication.

In addition to location metadata, other metadata of a picture can also be used to enhance the identity verification process. For example, a timestamp of the picture can be used to ensure that the picture is taken at the same time as the authentication process. In such cases, the system may compare the timestamp of the picture to the time when the picture is submitted to ensure that the times are within a specified period. Requiring the picture to be taken at the same relative time as authentication can minimize the possibility that an unauthorized user can obtain a picture of the user (or the user's ID) that will pass authentication.

The picture metadata can also be used to identify whether the picture has been altered. For example, an unauthorized user may attempt to modify a picture so that the modified picture will pass authentication (e.g. modifying a picture to appear more similar to the user). The system can identify metadata indicating that a picture has been altered and can potentially cause the authentication to fail.

As another example, metadata describing the device that took the picture can be used to ensure that the same device used for authentication/authorization is used to take the picture. In short, the system can analyze many different types of picture metadata to enhance the identity verification process when pictures are used.

In some embodiments, biometric information of the user can be obtained using client computing device 103 and sent with the user's signature or other input. For example, client computing device 103 can be configured to perform a fingerprint, face, iris, or retina scan. The obtained scan can serve as verification of the user's identity (e.g. by comparing the obtained scan to a stored scan) when providing the signature or other input as authorization for the merchant to perform some action.

In some embodiments, the authenticity of the user's signature can be verified by comparing a received signature to a stored signature for the user. To enable this type of signature verification, in some embodiments, the above described approach for remotely obtaining a user's signature can be used to obtain a copy of the user's signature to store for later comparison. For example, when a user registers to use the system of the present invention, a request can be sent to the user to provide a signature as described above. This initial signature can be received and stored for later comparison when the user desires to provide remote authorization using his signature. For example, when a merchant desires to receive the user's authorization to perform an action, the user's signature can again be obtained. The newly obtained signature can be compared to the stored signature for the user. When the signatures match, the authenticity of the user can be verified.

Each of the above described approaches for increasing the authenticity of the user's signature or other input can be used alone or in combination with another approach. For example, the user can be prompted to input some form of authenticating information (e.g. account information, social security number, etc.) in addition to providing a picture or scanning his fingerprint. Similarly, the location of the user can be included when the user also provides a picture of his driver's license.

In some embodiments, the specific approach for authenticating the user can be a merchant selectable feature. For example, if the merchant desires a high level of confidence in the authenticity of the user input (e.g. when the user is providing authorization for a high value/risk transaction), the merchant can specify in its request to server system 101 that the user provide a biometric scan or multiple levels of authenticating information. Accordingly, in such embodiments, the merchant can control the amount of authentication the user must perform in order to provide authorization remotely using the user's signature or other input.

Figure 10:
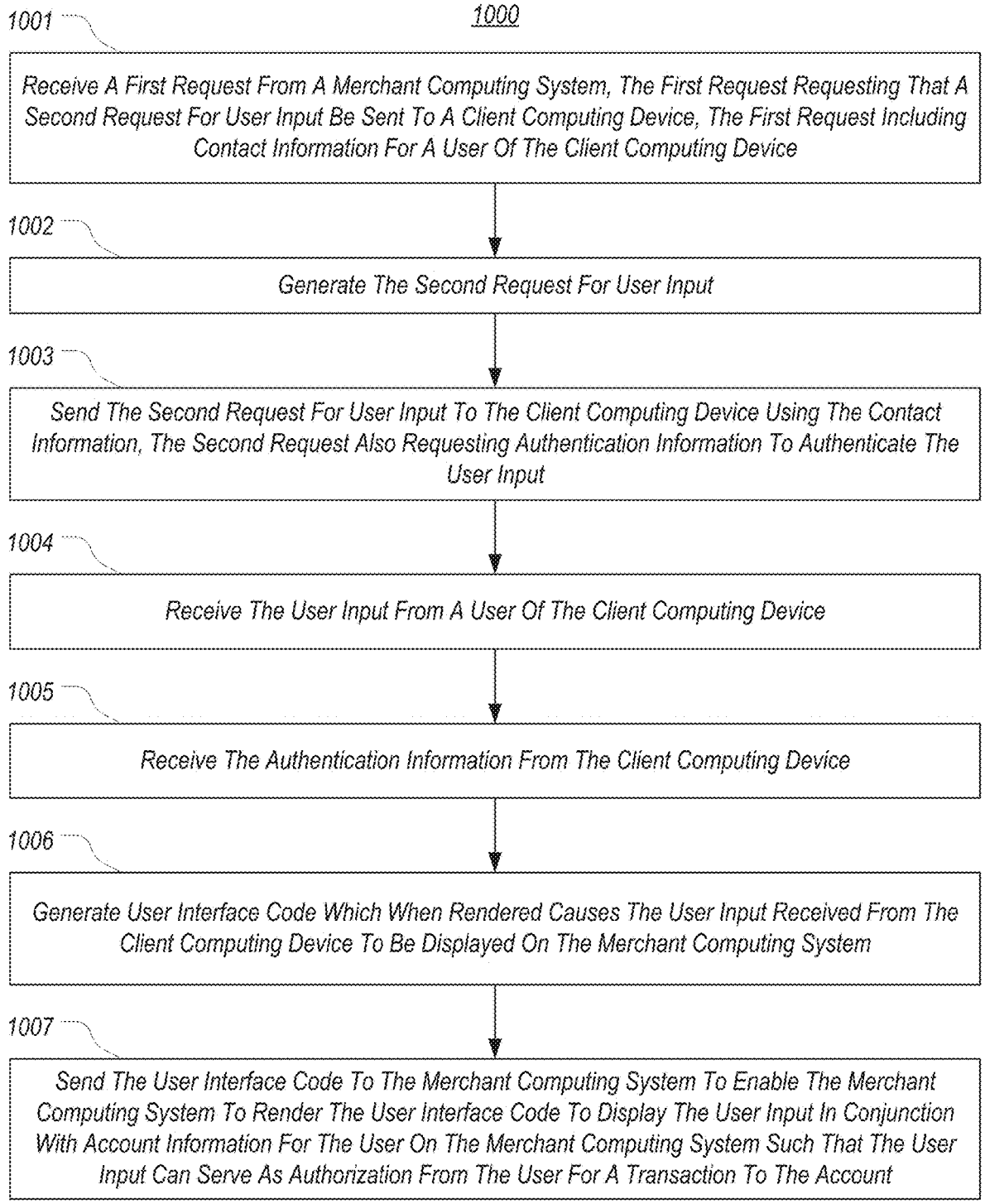
FIG. 10 illustrates a flowchart of an exemplary method for providing a request for user input to a client computing device over a network.

FIG. 10 illustrates a flowchart of an exemplary method 1000 for providing a request for user input to a client computing device over a network. Method 1000 can be performed by a server computing system that can communicate with a user's computing device.

Method 1000 includes an act 1001 of receiving a first request from a merchant computing system, the first request requesting that a second request for user input be sent to a client computing device, the first request including contact information for a user of the client computing device. For example, server system 101 can receive a request from merchant computing system 102 that includes contact information for sending a signature request to a user using client computing device 103.

Method 1000 includes an act 1002 of generating the second request for user input. For example, server system 101 can generate a signature request.

Method 1000 includes an act 1003 of sending the second request for user input to the client computing device using the contact information, the second request also requesting authentication information to authenticate the user input. For example, server system 101 can email, text, or otherwise send a link to client computing device 103.

Method 1000 includes an act 1004 of receiving the user input from a user of the client computing device. For example, server system 101 can receive the user's signature.

Method 1000 includes an act 1005 of receiving the authentication information from the client computing device. For example, server system 101 can receive a location of client computing device 103, a picture taken by client computing device 103, a biometric scan taken by client computing device 103, a shared secret, etc.

Method 1000 includes an act 1006 of generating user interface code which when rendered causes the user input received from the client computing device to be displayed on the merchant computing system. For example, server system 101 can generate user interface code for displaying the user input.

Method 1000 includes an act 1007 of sending the user interface code to the merchant computing system to enable the merchant computing system to render the user interface code to display the user input in conjunction with account information for the user on the merchant computing system such that the user input can serve as authorization from the user for a transaction to the account. For example, server system 101 can send the user interface code to merchant computing system 102 to enable merchant computing system 102 to perform a financial transaction.

Figure 11:
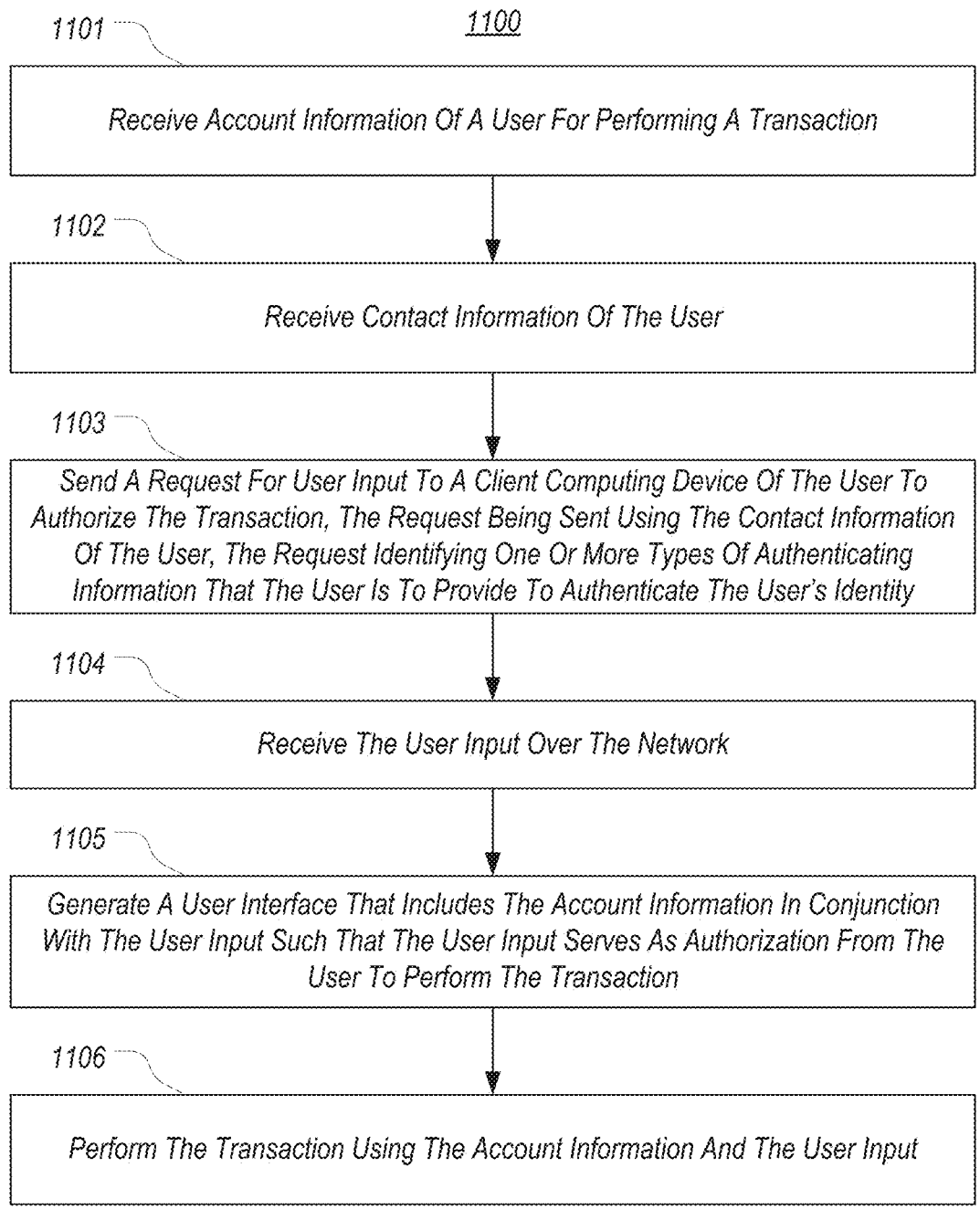
FIG. 11 illustrates a flowchart of an exemplary method for requesting user input from a remote user over a network.

FIG. 11 illustrates a flowchart of an exemplary method 1100 for requesting user input from a remote user over a network. Method 1100 can be performed by a merchant computing system that can communicate with a user's computing device via a server system.

Method 1100 includes an act 1101 of receiving account information of a user for performing a transaction. For example, merchant computing system 102 can receive account information for a transaction to be entered into with a user of client computing device 103.

Method 1100 includes an act 1102 of receiving contact information of the user. For example, merchant computing system 102 can receive contact information for communicating with client computing device 103.

Method 1100 includes an act 1103 of sending a request for user input to a client computing device of the user to authorize the transaction, the request being sent using the contact information of the user, the request identifying one or more types of authenticating information that the user is to provide to authenticate the user's identity. For example, merchant computing system 102 can send a request, via server system 101, to client computing device 103 using the contact information. The request can specify the type of authenticating information the user must provide to authenticate the user's identity.

Method 1100 includes an act 1104 of receiving the user input over the network. For example, merchant computing system 102 can receive the user's signature via server system 101.

Method 1100 includes an act 1105 of generating a user interface that includes the account information in conjunction with the user input such that the user input serves as authorization from the user to perform the transaction. For example, merchant computing system 102 can display the user input in conjunction with the account information.

Method 1100 includes an act 1106 of performing the transaction using the account information and the user input. For example, merchant computing system 102 can perform a credit card transaction using the user's signature as authorization.

FIG. 12 illustrates a flowchart of an exemplary method 1200 for remotely providing user input to authorize a transaction. Method 1200 can be performed by a client computing device that can communicate with a server system.

Method 1200 includes an act 1201 of receiving an electronic message that includes a link to a web page. For example, client computing device 103 can receive a text message that includes a link to a web page having an area to input a user's signature.

Method 1200 includes an act 1202 of in response to the selection of the link, displaying a web page that includes an area for receiving user input from a user via a touch screen of the client computing device. For example, when the user selects the link, a web page can be displayed by a browser on client computing device 103 that provides a signature area where the user can input a signature.

Method 1200 includes an act 1203 of sending the user input over the internet to a merchant computing system to enable the merchant computing system to perform the transaction using the user input. For example, client computing device 103 can send the user's signature to merchant computing system 102 via server system 101.

In some embodiments, an audit report can be created for each signature received using the above described process. Depending on the type of authentication that is employed, an audit report can include the signature (or other type of authorization input), the contact information used to send the signature request to the user, the location of the device when the signature was provided (including a map view and/or street view of the location), the time/date when the signature was provided, the shared secret question presented and answer provided, contact information used to send a receipt, a picture of the user or of the user's identity card, biometric information, etc. FIG. 17 illustrates an example of an audit report that can be generated.

An audit report can be provided to the user and/or the merchant as evidence that the user provided authorization for a transaction. For example, if a user, after providing authorization, claimed to have not authorized a transaction, the merchant could provide the audit report to the user to challenge his claim.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. In a server computing system, a method for enabling a plurality of merchant computing systems to obtain user input from users of a plurality of client computing devices without communicating with the client computing devices, the method comprising:
    configuring the server computing system to function as an intermediary between a plurality of merchant computing systems and a plurality of client computing devices for the purpose of enabling the merchant computing systems to obtain user input from users of the client computing devices without communicating with the client computing devices, wherein configuring the server computing system to function as the intermediary includes configuring the server computing system to provide an interface to the plurality of merchant computing systems, the interface configured to receive communications from an application executing on each of the plurality of merchant computing systems, the server computing system comprising memory that stores computer executable instructions defining the interface and a processor that executes the computer executable instructions to provide the interface;
    receiving, by the server computing system and via the interface, one or more first communications sent over the internet by the application executing on a first merchant computing system of the plurality of merchant computing systems, the one or more first communications including:
        (1) a request to obtain user input to serve as authorization for the first merchant computing system to perform a transaction to an account of a user,
        (2) contact information for the user,
        (3) information representing the transaction, and
        (4) a document to be presented to the user, the document representing an agreement that the user has made or will make;
    wherein the server computing system receives the one or more first communications from the application executing on the first merchant computing system without the first merchant computing system communicating with any client computing device of the user;
    extracting, by the server computing system, the contact information, the information representing the transaction, and the document from the one or more first communications;
    generating, by the server computing system, one or more webpages that include the document and an input area for receiving the user input from the user;
    formatting, by the server computing system, the one or more webpages to include the information representing the transaction that was provided in the one or more first communications;
    transmitting, by the server computing system and over a network, a second communication that targets a client computing device associated with the user based on the contact information that was provided in the one or more first communications, the server computing system transmitting the second communication without first communicating with the client computing device, the second communication including a link that the user can select, once the second communication is received by and displayed on the client computing device, to cause the one or more webpages to be displayed on the client computing device;
    in response to the user selecting the link included in the second communication once the second communication is received by and displayed on the client computing device, communicating, by the server computing system, directly with the client computing device including transmitting the one or more webpages to the client computing device such that the one or more webpages are displayed to the user to allow the user to review the document and provide the user input into the input area;
    in response to the user providing the user input, further communicating, by the server computing system, directly with the client computing device including receiving, from the client computing device, one or more third communications that include the user input, the user input comprising an authorization for performance of the agreement; and in response to receiving the one or more third communications, sending, by the server computing system, the user input to the first merchant computing system such that the first merchant computing system receives the user input without communicating with the client computing device, the receipt of the user input enabling the first merchant computing system to associate the user input with the account for the user on the first merchant computing system such that the user input can serve as authorization from the user to cause the performance of the agreement authorized by the user input.

2. The method of claim 1, wherein the user input comprises a signature of the user.

3. The method of claim 1, wherein the agreement comprises an agreement to make one or more payments.

4. The method of claim 3, wherein the user input comprises payment information for making the one or more payments.

5. The method of claim 3, wherein the user input authorizes the one or more payments using payment information stored by the first merchant computing system.

6. The method of claim 1, wherein the one or more webpages also includes a user interface for receiving payment information from the user.

7. The method of claim 1, wherein the one or more webpages comprise a first webpage that includes the document and a second webpage that includes the input area.

8. The method of claim 1, wherein the one or more webpages also include a request for authentication information.

9. The method of claim 8, wherein the one or more webpages comprise a first webpage that includes the request for authentication information and one or more other webpages that include the document and the input area, and wherein the server computing system transmits the first webpage to the client computing device to receive the authentication information and then transmits the one or more other webpages.

10. The method of claim 1, further comprising:
generating an additional webpage that includes a user interface for receiving a request from the user for a receipt identifying the authorization for the agreement; and
transmitting the additional webpage to the client computing device after receiving the one or more third communications.

11. The method of claim 1, wherein the one or more webpages comprise a single webpage that includes the document and the input area.

12. The method of claim 7, wherein transmitting the one or more webpages to the client computing device comprises transmitting the first webpage to the client computing device and then transmitting the second webpage to the client computing device in response to user interaction with the first webpage.

13. In a server computing system, a method for enabling a plurality of merchant computing systems to obtain user input from users of a plurality of client computing devices without communicating with the client computing devices, the method comprising:
configuring the server computing system to function as an intermediary between a plurality of merchant computing systems and a plurality of client computing devices for the purpose of enabling the merchant computing systems to obtain user input from users of the client computing devices without communicating with the client computing devices, wherein configuring the server computing system to function as the intermediary includes configuring the server computing system to provide an interface to the plurality of merchant computing systems, the interface configured to receive communications from an application executing on each of the plurality of merchant computing systems, the server computing system comprising memory that stores computer executable instructions defining the interface and a processor that executes the computer executable instructions to provide the interface;

receiving, by the server computing system and via the interface, one or more first communications sent over the internet by the application executing on a first merchant computing system of the plurality of merchant computing systems, the one or more first communications including:
(1) a request to obtain user input to serve as authorization for the first merchant computing system to perform a transaction to an account of a user,
(2) contact information for the user,
(3) information representing the transaction, and
(4) a document to be presented to the user, the document representing an agreement that the user has made or will make;

wherein the server computing system receives the one or more first communications from the application executing on the first merchant computing system without the first merchant computing system communicating with any client computing device of the user;

extracting, by the server computing system, the contact information, the information representing the transaction, and the document from the one or more first communications;

generating, by the server computing system, a first webpage that requests authentication information;

generating, by the server computing system, a second webpage that includes the document;

generating by the server computing system, a third webpage that includes an input area for receiving the user input from the user;

formatting, by the server computing system, the third webpage to include the information representing the transaction that was provided in the one or more first communications;

transmitting, by the server computing system and over a network, a second communication that targets a client computing device associated with the user based on the contact information that was provided in the one or more first communications, the server computing system transmitting the second communication without first communicating with the client computing device, the second communication including a link that the user can select, once the second communication is received by and displayed on the client computing device, to cause the first webpage to be displayed on the client computing device;

in response to the user selecting the link included in the second communication once the second communication is received by and displayed on the client computing device, communicating, by the server computing system, directly with the client computing device including transmitting the first webpage to the client computing device such that the request for authentication information is displayed to the user on the client computing device;

in response to the user providing the authentication information, further communicating, by the server computing system, directly with the client computing device including transmitting the second and third webpages to the client computing device such that the second and third webpages are displayed to the user to allow the user to review the document and provide the user input into the input area;

in response to the user providing the user input, further communicating, by the server computing system, directly with the client computing device including receiving one or more third communications that include the user input, the user input comprising an authorization for performance of the agreement; and in response to receiving the one or more third communications, sending, by the server computing system, the user input to the first merchant computing system such that the first merchant computing system receives the user input without communicating with the client computing device, the receipt of the user input enabling the first merchant computing system to associate the user input with the account for the user on the first merchant computing system such that the user input can serve as authorization from the user to cause the performance of the agreement authorized by the user input.

14. The method of claim 13, wherein the server computing system transmits the third webpage to the client computing device in response to user input to the second webpage.

15. The method of claim 13, further comprising:
generating, by the server computing system, a fourth webpage that includes a request for payment information to be used in the performance of the agreement; and
transmitting, by the server computing system, the fourth webpage to the client computing device.

16. The method of claim 13, wherein the user input comprises a signature of the user.

17. The method of claim 13, wherein the user input comprises payment information.

18. The method of claim 13, wherein the message-second communication is one of a text message, an email message, or a social media message.

19. The method of claim 15, wherein at least two of the second webpage, third webpage, and fourth webpage are the same webpage.

20. One or more non-transitory computer storage media storing computer executable instructions which when executed on a server computing system implement a method for enabling a plurality of merchant computing systems to obtain user input from users of a plurality of client computing devices without communicating with the client computing devices, the method comprising:

configuring the server computing system to function as an intermediary between a plurality of merchant computing systems and a plurality of client computing devices for the purpose of enabling the merchant computing systems to obtain user input from users of the client computing devices without communicating with the client computing devices, wherein configuring the server computing system to function as the intermediary includes configuring the server computing system to provide an interface to the plurality of merchant computing systems, the interface configured to receive communications from an application executing on each of the plurality of merchant computing systems;

receiving, by the server computing system and via the interface, one or more first communications sent over the internet by the application executing on a first merchant computing system of the plurality of merchant computing systems, the one or more first communications including:
(1) a request to obtain user input to serve as authorization for the first merchant computing system to perform a transaction to an account of a user,
(2) contact information for the user,
(3) information representing the transaction, and
(4) a document to be presented to the user, the document representing an agreement that the user has made or will make;

wherein the server computing system receives the one or more first communications from the application executing on the first merchant computing system without the first merchant computing system communicating with any client computing device of the user;

extracting, by the server computing system, the contact information, the information representing the transaction, and the document from the one or more first communications;

generating, by the server computing system, one or more webpages that include the document and an input area for receiving the user input from the user;

formatting, by the server computing system, the one or more webpages to include the information representing the transaction that was provided in the one or more first communications;

transmitting, by the server computing system and over a network, a second communication that targets a client computing device associated with the user based on the contact information that was provided in the one or more first communications, the server computing system transmitting the second communication without first communicating with the client computing device, the second communication including a link that the user can select, once the second communication is received by and displayed on the client computing device, to cause the one or more webpages to be displayed on the client computing device;

in response to the user selecting the link included in the second communication once the second communication is received by and displayed on the client computing device, communicating, by the server computing system, directly with the client computing device including transmitting the one or more webpages to the client computing device such that the one or more webpages are displayed to the user to allow the user to review the document and provide the user input into the input area;

in response to the user providing the user input, further communicating, by the server computing system, directly with the client computing device including receiving, from the client computing device, one or more third communications that include the user input, the user input comprising an authorization for performance of the agreement; and in response to receiving the one or more third communications, sending, by the server computing system, the user input to the first merchant computing system such that the first merchant computing system receives the user input without communicating with the client computing device, the receipt of the user input enabling the first merchant computing system to associate the user input with the account for the user on the first merchant computing system such that the user input can serve as authorization from the user to cause the performance of the agreement authorized by the user input.

\* \* \* \* \*